United States Patent
Lai

(10) Patent No.: US 12,015,447 B2
(45) Date of Patent: Jun. 18, 2024

(54) MICROCONTROLLER AND SIGNAL MODULATION METHOD

(71) Applicant: Nuvoton Technology Corporation, Hsinchu (TW)

(72) Inventor: Yun-Kai Lai, Hsinchu (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 17/710,325

(22) Filed: Mar. 31, 2022

(65) Prior Publication Data

US 2022/0329325 A1 Oct. 13, 2022

(30) Foreign Application Priority Data

Apr. 8, 2021 (TW) ................................. 110112737

(51) Int. Cl.
*H04B 10/524* (2013.01)
*H04B 10/2575* (2013.01)

(52) U.S. Cl.
CPC ..... *H04B 10/524* (2013.01); *H04B 10/25759* (2013.01)

(58) Field of Classification Search
CPC ......................... H04B 10/524; H04B 10/25759
USPC ........................................................ 398/189
See application file for complete search history.

(56) References Cited

U.S. PATENT DOCUMENTS

| | | | |
|---|---|---|---|
| 6,686,879 B2 | 2/2004 | Shattil | |
| 6,850,707 B1 * | 2/2005 | Chang | H04J 14/0227 398/79 |
| 7,809,266 B2 * | 10/2010 | Lee | H04J 14/02 398/68 |
| 2002/0034191 A1 | 3/2002 | Shattil | |
| 2012/0014694 A1 | 1/2012 | Templ et al. | |
| 2013/0099817 A1 * | 4/2013 | Haigh | H03K 19/003 326/21 |
| 2015/0071651 A1 * | 3/2015 | Asmanis | H04B 10/697 398/141 |
| 2016/0087747 A1 * | 3/2016 | Way | H04J 14/0221 398/81 |

(Continued)

FOREIGN PATENT DOCUMENTS

| | | |
|---|---|---|
| CN | 1132969 A | 10/1996 |
| CN | 1756247 A | 4/2005 |

(Continued)

OTHER PUBLICATIONS

Wolf et al; On the DC balance of multi-level PAM VLC systems; 2019; IEEE; pp. 1-5. (Year: 2019).*

(Continued)

*Primary Examiner* — Amritbir K Sandhu
(74) *Attorney, Agent, or Firm* — MUNCY, GEISSLER, OLDS & LOWE, P.C.

(57) ABSTRACT

A microcontroller includes a setting unit, an encoder, a modulation circuit, and a digital-to-analog converter. The setting unit outputs a control signal. The encoder outputs a digital signal that is encoded. The modulation circuit loads at least one carrier signal on the digital signal at the logic high level and/or the logic low level according to the control signal to generate a modulated digital signal. The digital-to-analog converter converts the modulated digital signal into an analog signal, and outputs the analog signal for transmission.

14 Claims, 4 Drawing Sheets

(56) References Cited

U.S. PATENT DOCUMENTS

2016/0226593 A1* 8/2016 Ganick ............... H04B 10/502
2017/0295627 A1* 10/2017 Lo ....................... H05B 47/195
2019/0132000 A1* 5/2019 Kim .................... H04B 10/116

FOREIGN PATENT DOCUMENTS

| CN | 102246433 A | 11/2011 | | |
|----|-------------|---------|---|---|
| CN | 102474305 A | 5/2012 | | |
| TW | 200623689 A | 7/2006 | | |
| TW | 201126459 A | 8/2011 | | |
| WO | WO-2019032379 A1 * | 2/2019 | ........... | H04B 10/541 |

OTHER PUBLICATIONS

Festus et al; Performance evaluation of four-level modified Manchester modulation format for high-speed optical transmission systems; Aug. 2019; IET Journals; pp. 1-8. (Year: 2019).*
An Office Action and Search Report in corresponding CN Application No. 202210025169.7 dated May 7, 2023 is attached, 5 and 3 pages respectively.

* cited by examiner

MICROCONTROLLER AND SIGNAL MODULATION METHOD

CROSS REFERENCE TO RELATED APPLICATIONS

This application claims priority of and the benefit of Taiwan Application No. 110112737, filed on Apr. 8, 2021, the entirety of which are incorporated by reference herein.

FIELD OF THE DISCLOSURE

The disclosure is related to an electronic device, and in particular it is related to a microcontroller and the signal modulation method thereof.

DESCRIPTION OF THE RELATED ART

With the development of 5G communication technology, optical fiber transmission between high-density and long-distance base stations will be quite necessary. In addition to the encoding and decoding of the data at the transmitting and receiving end, the carrier signal is loaded on the signal of a specific wavelength to transmit the data, so that the efficiency of transmitting and receiving data through optical fiber transmission is greater. If carrier signals with different frequencies are loaded on an optical carrier of the same wavelength, it is necessary to calculate the time and period of the carrier signal, and then use the central processing unit (CPU) to intervene to change the modulation settings for the carrier signal.

Considering multi-channel transmission and reception applications, more transmitting and receiving ends of optical modules will need to be used. In the existing implementation, if the pulse width modulation (PWM) is used to automatically adjust the duty cycle to create the carrier signal, the charging and discharging of the external capacitor, the resistance value, and the temperature drift characteristics will need to be considered, as they will become more difficult to control.

BRIEF SUMMARY OF THE DISCLOSURE

In order to resolve the issue described above, the present disclosure provides a microcontroller. The microcontroller includes a setting unit, an encoder, a modulation circuit, and a digital-to-analog converter. The setting unit outputs a control signal. The encoder outputs a digital signal that is encoded. The modulation circuit loads at least one carrier signal on the digital signal at the logic high level and/or the logic low level according to the control signal to generate a modulated digital signal. The digital-to-analog converter converts the modulated digital signal into an analog signal, and outputting the analog signal for transmission.

According to the microcontroller disclosed above, the control signal includes the number of samples per period of the digital signal, the interval period of sampling the digital signal, the amplitude of the carrier signal, the bias of the carrier signal, and the interval period of outputting the modulated digital signal.

According to the microcontroller disclosed above, the modulation circuit includes a carrier control unit, a sampling control unit, a data update control unit, a data period control unit, an amplitude and bias adjustment unit, and a data generating unit. The carrier control unit receives the digital signal, determines whether to load the carrier signal in the digital signal at the logic high level and/or the logic low level according to the control signal, and correspondingly outputs a first setting result. The sampling control unit determines the number of samples per period of the digital signal according to the control signal, and correspondingly outputs a second setting result. The data update control unit determines the interval period for outputting the modulated digital signal to the digital-to-analog converter according to the control signal, and correspondingly outputs a third setting result. The data period control unit determines the interval period for sampling the digital signal according to the second setting result and the third setting result, correspondingly outputs a fourth setting result, and outputs the second and third setting result. The amplitude and bias adjustment unit determines the amplitude of the carrier signal and the bias of the carrier signal according to the control signal and correspondingly, it outputs a fifth setting result. The data generating unit generates the modulated digital signal according to the first, second third, fourth, and fifth setting results.

According to the microcontroller disclosed above, the modulation circuit further includes a first multiplexer and a second multiplexer. The first multiplexer correspondingly outputs a logic high level signal or a logic low level signal with a preset data size according to the digital signal. The second multiplexer correspondingly outputs the modulated digital signal, or outputs the logic high level signal or the logic low level signal synchronized with the digital signal according to the second setting result from the sampling control unit.

According to the microcontroller disclosed above, when the digital signal is at the logic high level, the first multiplexer outputs the logic high level signal with the preset data size. When the digital signal is at the logic low level, the first multiplexer outputs the logic low level signal with the preset data size.

According to the microcontroller disclosed above, when the number of samples per period of the digital signal is not equal to zero, the second multiplexer outputs the modulated digital signal. When the number of samples per period of the digital signal is equal to zero, the second multiplexer outputs the logic high level signal or the logic low level signal synchronized with the digital signal.

According to the microcontroller disclosed above, the preset data size depends on the resolution of the digital-to-analog converter.

According to the microcontroller disclosed above, the microcontroller further includes a decoder and at least one comparator. The decoder receives and decodes the modulated digital signal to obtain the data content of the digital signal. The comparator filters the carrier signal according to the frequency of the carrier signal loaded on the digital signal at the logic high level and/or the logic low level.

According to the microcontroller disclosed above, the encoder is a Manchester encoder, and the decoder is a Manchester decoder.

The present disclosure also provides a method of signal modulation. The method includes receiving a control signal and a data signal; encoding the data signal to generate a digital signal that is encoded; loading at least one carrier signal on the digital signal at the logic high level and/or the logic low level according to the control signal to generate a modulated digital signal; and converting the modulated digital signal into an analog signal, and outputting the analog signal for transmission.

According to the method disclosed above, the control signal includes the number of samples per period of the digital signal, the interval period of sampling digital signal, the amplitude of the carrier signal, the bias of the carrier signal, and the interval period of outputting the modulated digital signal.

According to the method disclosed above, the method further includes outputting a logic high level signal or a logic low level signal with a preset data size correspondingly according to the digital signal; and outputting the modulated digital signal correspondingly or outputting the logic high level signal or the logic low level signal synchronized with the digital signal according to the number of samples per period of the digital signal.

According to the method disclosed above, when the digital signal is at the logic high level, outputting the logic high level signal with the preset data size. When the digital signal is at the logic low level, outputting the logic low level signal with the preset data size.

According to the method disclosed above, when the number of samples per period of the digital signal is not equal to zero, outputting the modulated digital signal; when the number of samples per period of the digital signal is equal to zero, outputting the logic high level signal or the logic low level signal synchronized with the digital signal.

According to the method disclosed above, the method further includes receiving and decoding the modulated digital signal to obtain the data content of the digital signal; and filtering the carrier signal according to the frequency of the carrier signal loaded on the digital signal at the logic high level and/or the logic low level.

According to the method disclosed above, encoding the data signal includes encoding the data signal using Manchester coding.

BRIEF DESCRIPTION OF THE DRAWINGS

The disclosure can be more fully understood by reading the subsequent detailed description with references made to the accompanying figures, it should be understood that the figures are not drawn to scale in accordance with standard practice in the industry, in fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

In order to make the above purposes, features, and advantages of some embodiments of the present disclosure more comprehensible, the following is a detailed description in conjunction with the accompanying drawings.

It should be understood that the words "comprise" and include used in the present disclosure are used to indicate the existence of specific technical features, values, method steps, operations, units and/or components. However, it does not exclude that more technical features, numerical values, method steps, work processes, units, components, or any combination of the above can be added.

The words "first", "second", "third", "fourth", "fifth", and "sixth" are used to describe components, they are not used to indicate the priority order of or advance relationship, but only to distinguish components with the same name.

Figure 1:
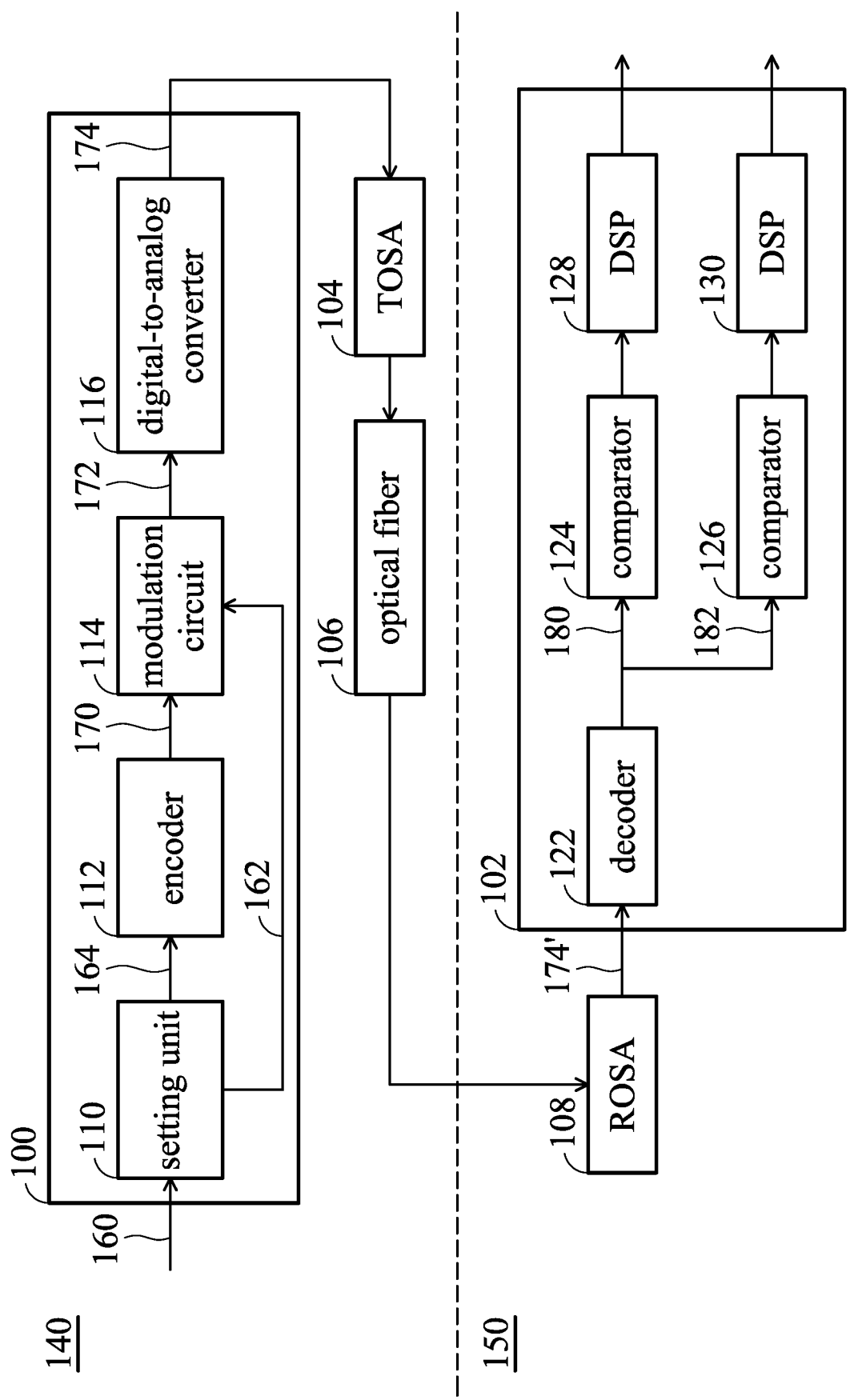
FIG. 1 is a schematic diagram of microcontrollers 100 and 102 in accordance with some embodiments of the disclosure.

FIG. 1 is a schematic diagram of microcontrollers 100 and 102 in accordance with some embodiments of the disclosure. As shown in FIG. 1, the microcontroller 100 is arranged in an electronic device of the transmitting end 140, and the microcontroller 102 is arranged in another electronic device of the receiving end 150. In some embodiments, the electronic device of the transmitting end 140 and the electronic device of the receiving end 150 may be, for example, a base station for wireless communication, but the present disclosure is not limited thereto. The electronic device of the transmitting end 140 intends to transmit data to the electronic device of the receiving end 150 through an optical fiber 106.

The microcontroller 100 includes a setting pit 110, an encoder 112, a modulation circuit 114, and a digital-to-analog converter 116. In some embodiments, after the electronic device of the transmitting terminal 140 is turned on or executing certain programs, the setting unit 110 receives an initial control signal 160 from the electronic device (such as a central processing unit (CPU)) of the transmitting end 140. The setting unit 110 correspondingly transmits a control signal 162 to the modulation circuit 114, and transmits a control signal 164 to the encoder 112 according to the initial control signal 160.

In some embodiments, the encoder 112 sets its own parameters according to the control signal 164. In some embodiments, the encoder 112 receives a data signal (not shown) to be transmitted from the central processing unit of the electronic device at the transmitting end 140. The encoder 112 encodes the data signal to generate and output a digital signal 170 to the modulation circuit 114. In some embodiments, the encoder 112 is a Manchester encoder, but the present disclosure is not limited thereto.

The modulation circuit 114 loads at least one carrier signal (for example, the carrier signals 180 and 182) on the digital signal 170 at the logic high level and/or the logic low level according to the control signal 162 to generate a modulated digital signal 172. In some embodiments, the control signal 162 includes a number of setting parameters, such as the number of samples per period of the digital signal 170, the interval period of sampling the digital signal 170, the amplitude of the carrier signal, the bias of the carrier signal, and the interval period of outputting the modulated digital signal 172.

Then, the digital-to-analog converter 116 converts the modulated digital signal 172 into an analog signal 174. The optical transmitter (TOSA) 104 converts the analog signal 174 into a corresponding optical signal. The optical signal is transmitted to the electronic device of the receiving end 150 through the transmission of the optical fiber 106, and is received by the optical receiver (ROSA) 108. The optical receiver 108 restores the optical signal to an electrical signal, and correspondingly outputs a modulated digital signal 174'. In some embodiments, the optical receiver 108 further includes an analog-to-digital converter (not shown) for converting the electrical signal restored by the optical receiver 108 into the modulated digital signal 174'. In some embodiments, the analog-to-digital converter may also exist in the decoder 122, and the present disclosure is not limited thereto.

The decoder 122 receives and decodes the modulated digital signal 174' to obtain the data content of the digital signal (that is, the content of the data signal). In some embodiments, the decoder 122 transmits the carrier signal 180 and the carrier signal 182 to the comparator 124 and the comparator 126. In some embodiments, the decoder 122 may be a Manchester decoder, but the present disclosure is not limited thereto.

In some embodiments, the frequency of the carrier signal 180 is f1, and the frequency of the carrier signal 182 is f2. Since the carrier signal 180 is carried on the digital signal 170 at the logic high level, the carrier signal 182 is carried on the digital signal 170 at the logic low level, the DC component (or bias) of the carrier 180 may be greater than the DC component of the carrier signal 182. Therefore, the comparator 124 and the comparator 126 need to set the corresponding reference voltage (Vref), so that the comparator 124 can filter out the carrier signal 182 and convert the carrier signal 180 into a corresponding digital signal for use by the subsequent digital signal processor (DSP) 128. Similarly, the comparator 126 can filter out the carrier signal 180 and convert the carrier signal 182 into another digital signal for use by the subsequent digital signal processor 130.

In some embodiments, the microcontroller 100 and the microcontroller 102 in FIG. 1 are the same microcontroller. In other words, for the convenience of illustration, the decoder, the comparator, and the digital signal processor of the microcontroller 100 are omitted in FIG. 1. Similarly, for the convenience of illustration, the decoder, the comparator, and the digital signal processor of the microcontroller 102 are omitted in FIG. 1. In other words, the microcontrollers 100 and 102 in FIG. 1 have functions of encoding, decoding, modulation, and demodulation at the same time.

Figure 2:
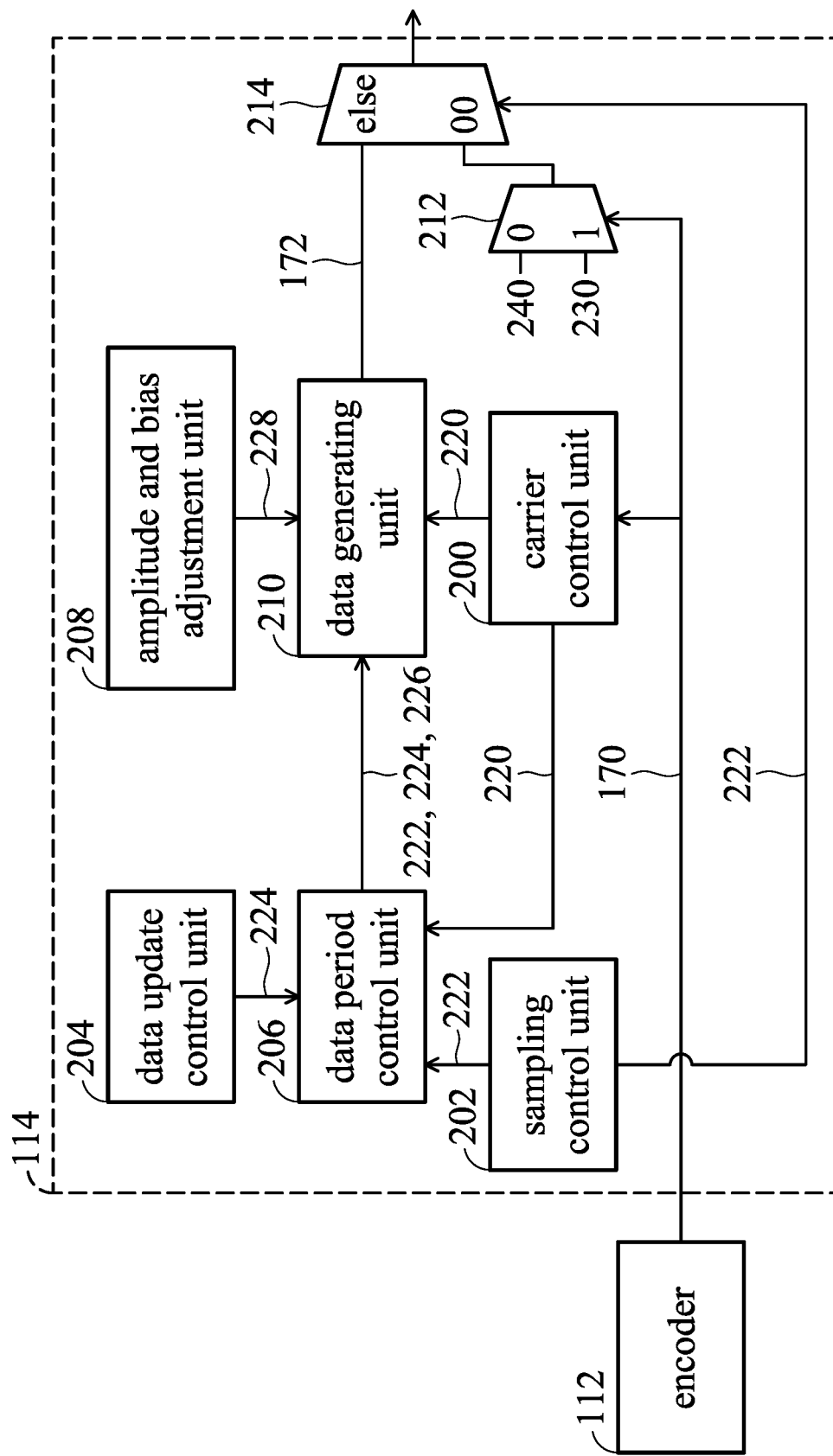
FIG. 2 is a schematic diagram of a modulation circuit 114 of the microcontroller 100 in FIG. 1 in accordance with some embodiments of the disclosure.

FIG. 2 is a schematic diagram of a modulation circuit 114 of the microcontroller 100 in FIG. 1 in accordance with some embodiments of the disclosure. As shown in FIG. 2, the modulation circuit 114 includes a carrier control unit 200, a sampling control unit 202, a data update control unit 204, a data period control unit 206, an amplitude and bias adjustment unit 208, a data generating unit 210, a multiplexer 212, and a multiplexer 214.

The carrier control unit 200 receives the digital signal 170 from the encoder 112 in 1, and determines whether to load the carrier signal (for example, the carrier signal 180 and/or the carrier signal 182) in the digital signal 170 at the logic high level and/or the logic low level according to the control signal 162, and correspondingly outputs a setting result 220. In some embodiments, in the setting result 220, the carrier control unit 200 may load only the carrier signal 180 on the digital signal 170 at the logic high level. The carrier control unit 200 may load only the carrier signal 182 on the digital signal 170 at the logic low level. The carrier control unit 200 may load the carrier signal 180 on the digital signal 170 at the logic high level while simultaneously loading the carrier signal 182 on the digital signal 170 at the logic low level.

The sampling control unit 202 determines the number of samples per period of the digital signal 170 according to the control signal 162, and correspondingly outputs a setting result 222. In some embodiments, the selling result 222 is sent to the data period control unit 206 and the multiplexer 214. In some embodiments, the number of samples per period of the digital signal 170 in the setting result 222 can be 0, 8, 16, and 32, but the present disclosure is not limited thereto.

The data update control unit 204 determines the interval period for outputting the modulated digital signal 172 to the digital-to-analog converter 116 according to the control signal 162, and correspondingly outputs a setting result 224, The data period control unit 206 determines the interval period for sampling the digital signal 170 according to the setting result 222 from the sampling control unit 202 and the setting result 224 from the data update control unit 204, correspondingly outputs a setting result 226, and outputs the setting result 222 and 224 simultaneously.

The amplitude and bias adjustment unit 208 determines the amplitude of the carrier signal (for example, the carrier signal 180 and/or 182) and the bias of the carrier signal according to the control signal 162, and correspondingly, it outputs the setting result 228. The data generating unit 210 generates the modulated digital signal 172 according to the setting result 220 from the carrier control unit 200, the setting result 228 from the amplitude and bias adjustment unit 208, the setting results 222, 224, and 226 from the data period control unit 206.

In some embodiments, the multiplexers 212 and 214 are the key components of whether the modulation circuit 114 outputs the modulated digital signal 172 or not. As shown in FIG. 2, the two input terminals of the multiplexer 212 are electrically coupled to a logic high level signal 230 and a logic low level signal 240 respectively. The output terminal of the multiplexer 212 is electrically coupled to one of the input terminals of the multiplexer 214. The control terminal of the multiplexer 212 is electrically coupled to the digital signal 170 from the encoder 112. The multiplexer 212 correspondingly outputs the logic high level signal 230 or the logic low level signal 240 having a preset data size according to the digital signal 170.

In other words, when the digital signal 170 is at the logic high level, the multiplexer 212 outputs the logic high level signal 230 having a preset data size. When the digital signal 170 is at the logic low level, the multiplexer 212 outputs the logic low level signal 240 having the preset data size. In some embodiments, the preset data size depends on the resolution of the digital-to-analog converter 116. In some embodiments, the resolution of the digital-to-analog converter 116 is 12 bits. Therefore, the logic low level signal 240 is "0" represented by 12 bits (for example, 12'h000), and the logic high level signal 230 is "1" represented by 12 bits (for example, 12'hfff). To put it simply, the output of the multiplexer 212 is synchronized with the digital signal 170 output by the encoder 112.

The two input terminals of the multiplexer 214 are electrically coupled to the modulated digital signal 172 output by the data generating unit 210 and the output from the multiplexer, respectively. The control terminal of the multiplexer 214 is electrically coupled to the setting result 222 from the sampling control unit 202. In other words, the multiplexer 214 correspondingly outputs the modulated digital signal 172, or outputs the logic high level signal 230 or the logic low level signal 240 synchronized with the digital signal 170 according to the setting result 222 from the sampling control unit 202.

For example, when the number of samples per period of the digital signal 170 in the setting result 222 is not equal to zero (that is, the "else" marked in the multiplexer 214, which may be 8, 16 or 32), the multiplexer 214 outputs the modulated digital signal 172. When the number of samples per period of the digital signal 170 in the setting result 222 is equal to zero, the multiplexer 214 outputs the logic high level signal 230 or the logic low level signal 240 synchronized with the digital signal 170. In some embodiments, when the number of samples per period of the digital signal 170 in the setting result 222 is equal to zero, which means that the modulation function of the modulation circuit 114 is turned off, the modulation circuit 114 only correspondingly converts the digital signal 170 from the encoder 112 into a digital signal with a preset data size per period.

Figure 3A:
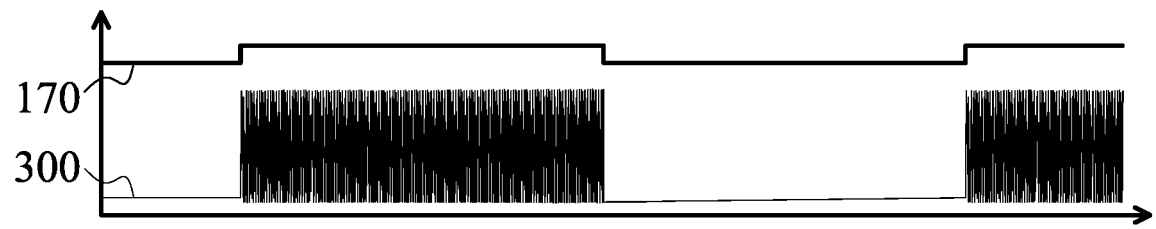
FIGS. 3A, 3B and 3C are schematic diagrams of the waveforms of a digital signal 170 and carrier signals in FIG. 1 in accordance with some embodiments of the disclosure.

FIG. 3A is a schematic diagram of the waveforms of a digital signal 170 and a carrier signal 300 in FIG. 1 in accordance with some embodiments of the disclosure. As shown in FIG. 3A, the carrier control unit 200 in FIG. 2 loads the carrier signal 300 on the digital signal 170 at the logic high level. Therefore, there is no carrier signal on the digital signal 170 at the logic low level. The frequency of the carrier signal 300 in FIG. 3A is f1.

Figure 3B:
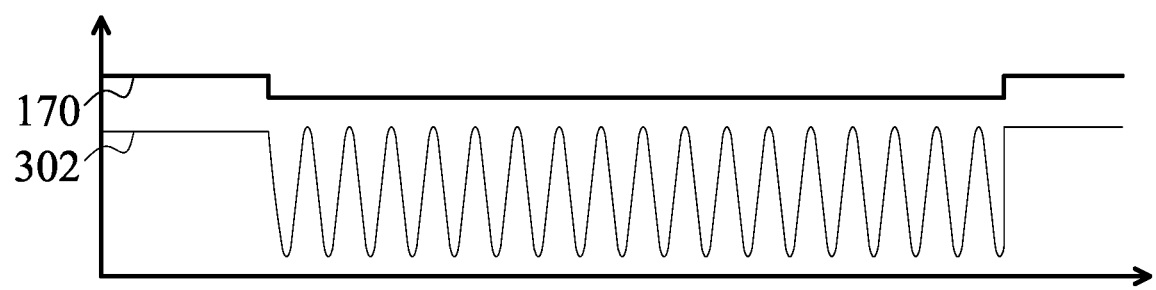

FIG. 3B is a schematic diagram of the waveforms of a digital signal 170 and a carrier signal 302 in FIG. 1 in accordance with some embodiments of the disclosure. As shown in FIG. 3B the carrier control unit 200 in FIG. 2 loads the carrier signal 302 on the digital signal 170 at the logic low level. Therefore, there is no carrier signal on the digital signal 170 at the logic high level. The frequency of the carrier signal 302 in FIG. 3A is f2. Comparing FIGS. 3A and 3B, it can be seen that the frequency f1 of the carrier signal 300 is higher than the frequency f2 of the carrier signal 302.

Figure 3C:
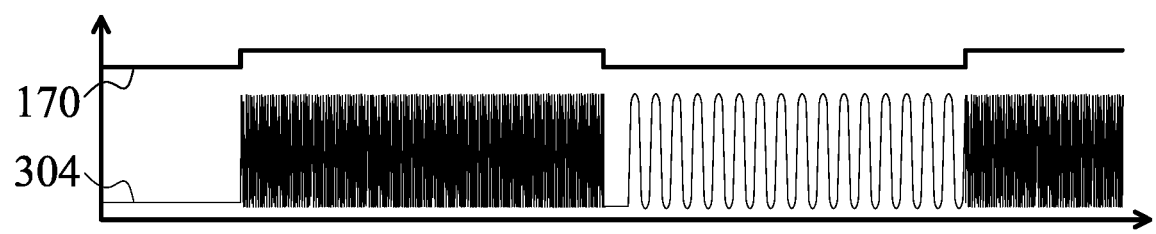

FIG. 3C is a schematic diagram of the waveforms of a digital signal 170 and a carrier signal 304 in FIG. 1 in accordance with some embodiments of the disclosure. As shown in FIG. 3C, the carrier control unit 200 in FIG. 2 loads the carrier signal 300 on the digital signal 170 at the logic high level while simultaneously loading the carrier signal 302 on the digital signal 170 at the logic low level to obtain the waveform of the carrier signal 304. In other words, the microcontroller 100 of the present disclosure may transmit twice the amount of carrier data.

The microcontroller 100 of the present disclosure may reduce hardware costs, reduce the use of optical modules, and does not require the CPU of the electronic device of the transmitting end 140 to intervene to change the modulation control settings through the pre-calculated time. On the other hand, the microcontroller 102 in the electronic device of the receiving end 150 may filter out two-frequency carrier information from a set of optical carrier lengths, which can save spectrum resources.

Figure 4:
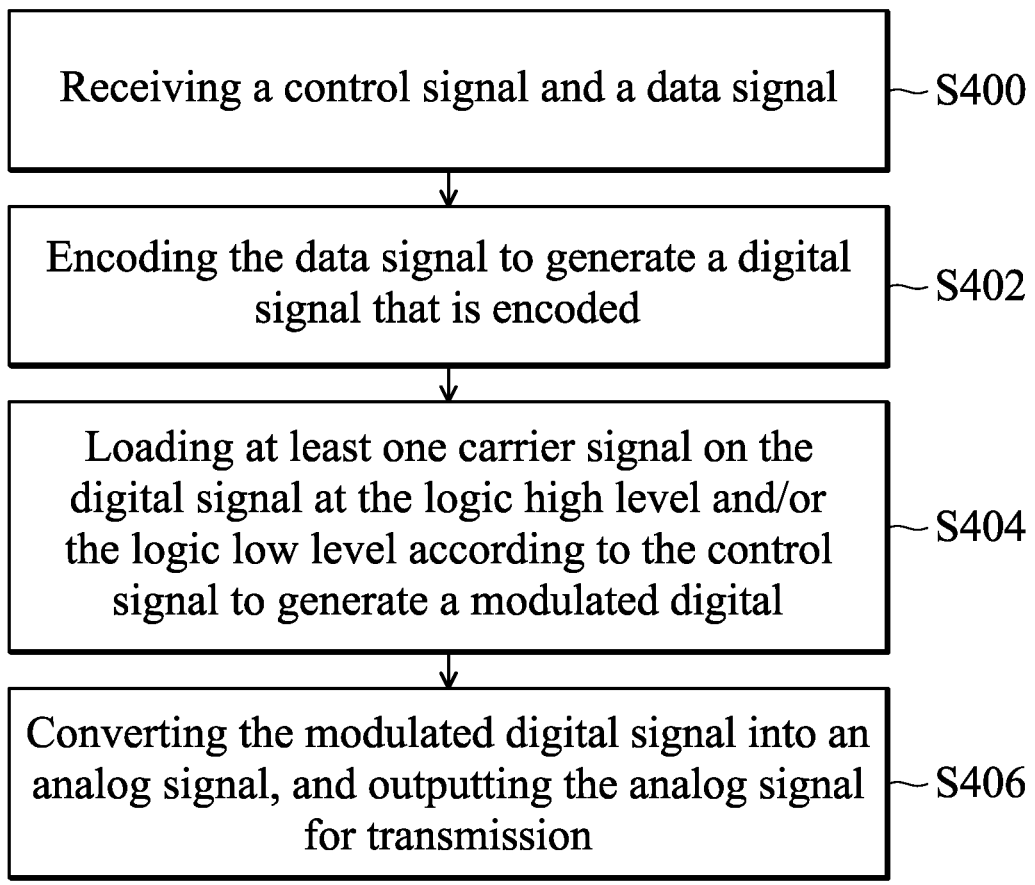
FIG. 4 is a flow chart of a method of signal modulation in accordance with some embodiments of the disclosure.

FIG. 4 is a flow chart of a method of signal modulation in accordance with some embodiments of the disclosure. As shown in FIG. 4, the method of signal modulation of the present disclosure includes receiving a control signal and a data signal (step S400); encoding the data signal to generate a digital signal that is encoded (step S402); loading at least one carrier signal on the digital signal at the logic high level and/or the logic low level according to the control signal to generate a modulated digital signal (step S404); and converting the modulated digital signal into an analog signal, and outputting the analog signal for transmission (step S406).

In some embodiments, the modulation circuit 144 in FIG. 1 receives the control signal (such as the control signal 162) in step S400, and the encoder 112 in FIG. 1 receives the data signal from the CPU of the electronic device of the transmitting end 140, in some embodiments, the encoder 112 in FIG. 1 executes step S402, the modulation circuit 114 in FIG. 1 executes step S404, and the digital-to-analog converter 116 in FIG. 1 executes step S406.

In step S400, the received control signal (such as the control signal 162) includes the number of samples per period of the digital signal 170, the interval period of sampling the digital signal 170, the amplitude of the carrier signal (for example, the carrier signal 300 in FIG. 3A and/or the carrier signal 302 in FIG. 3B), the bias of the carrier signal, and the interval period of outputting the modulated digital signal (such as the modulated digital signal 172 in FIG. 1). In step S402, the encoder 112 in FIG. 1 performs Manchester encoding on the data signal.

In step S404, the multiplexer 212, in FIG. 2 correspondingly outputs a logic high level signal 230 or a logic low level signal 240 having a preset data size according to the signal digital 170. In detail, when the digital signal 170 is at the logic high level, the multiplexer 212 outputs the logic high level signal 230 having the preset data size. When the digital signal 170 is at the logic low level, the multiplexer 212 outputs the logic low level signal 230 having the preset data size.

In step S404, the multiplexer 214 in FIG. 2 outputs the modulated digital signal 172, or outputs the logic high level signal 230 or the logic low level signal 240 synchronized with the digital signal 170 according to the number of samples per period of the digital signal 170 (for example, 0, 8, 16 and 24). In detail, when the number of samples per period of the digital signal 170 is not equal to zero (for example, 8, 16 and 24), the multiplexer 214 outputs the modulated digital signal 172. When the number of samples per period of the digital signal 170 is equal to zero, the multiplexer 214 outputs the logic high level signal 230 or the logic low level signal 240 synchronized with the digital signal 170.

The advantage of the microcontroller 100 of the present disclosure is that the encoder 112, the modulation circuit 114, and the digital-to-analog converter 116 can operate independently at ordinary times to avoid power consumption. Only when the microcontroller 100 needs to perform the optical fiber transmission function will the linkage relationship be activated (that is, the modulation function of the modulation circuit 114 is turned on), and the encoder 112 will be automatically turned off to save power when the encoder 112 is no longer transmitting.

When the modulation function of the modulation circuit 114 is turned on, the CPU of the electronic device at the transmitting end 140 only needs to make a one-time setting for the encoder 112 and the modulation circuit 114 at the beginning (for example, through the setting unit 110). As long as the electronic device of the receiving end 150 has a corresponding microcontroller (such as the microcontroller 102), the electronic device of the receiving end 150 can receive and decode the information contained in the packet transmitted by the encoder 112, and at the same time, the desired carrier signal with different frequencies is obtained by the comparator, and the carrier signal is converted into a digital signal to provide different transmission channels for signal processing.

The embodiments of the present disclosure are disclosed above, but they are not used to limit the scope of the present disclosure, A person skilled in the art can make some changes and retouches without departing from the spirit and scope of the embodiments of the present disclosure. Therefore, the scope of protection in the present disclosure shall be defined by the scope of the attached claims.

What is claimed is:

1. A microcontroller, comprising:
    an encoder, receiving a data signal, and encoding the data signal to output a digital signal that is encoded;
    a modulation circuit, loading a first carrier signal on the digital signal at logic high level and loading a second carrier signal on the digital signal at logic low level according to a control signal to generate a modulated digital signal, wherein a frequency of the first carrier signal is different from a frequency of the second carrier signal; wherein the control signal is generated by the microcontroller, and wherein the control signal comprises number of samples per period of the digital signal, interval period of sampling the digital signal, amplitude of the first and second carrier signals, bias of the first and second carrier signals, and interval period of the modulated digital signal; and a digital-to-analog converter, converting the modulated digital signal into an analog signal, and outputting the analog signal for transmission.

2. The microcontroller as claimed in claim 1, wherein the modulation circuit receives the digital signal, determines whether to load the first carrier signal in the digital signal at the logic high level and/or to load the first carrier signal in the digital signal at the logic low level according to the control signal, and correspondingly outputs a first setting result;

the modulation circuit determines number of samples per period of the digital signal according to the control signal, and correspondingly outputs a second setting result;

the modulation circuit determines an interval period for outputting the modulated digital signal to the digital-to-analog converter according to the control signal, and correspondingly outputs a third setting result;

the modulation circuit determines interval period of sampling the digital signal according to the second setting result and the third setting result, correspondingly outputs a fourth setting result, and outputs the second and the third setting result;

the modulation circuit determines the amplitude of the first and second carrier signals and bias of the first and carrier signals according to the control signal, and correspondingly, outputs a fifth setting result; and the modulation circuit generates the modulated digital signal according to the first, second, third, fourth, and fifth setting results.

3. The microcontroller as claimed in claim 2, wherein the modulation circuit further comprises:

a first multiplexer, correspondingly outputting the logic high level signal or the logic low level signal with a preset data size according to the digital signal; and a second multiplexer, correspondingly outputting the modulated digital signal, or outputting the logic high level signal or the logic low level signal synchronized with the digital signal according to the second setting result from the sampling control unit.

4. The microcontroller as claimed in claim 3, wherein when the digital signal is at the logic high level, the first multiplexer outputs the logic high level signal with a first preset data size; when the digital signal is at the logic low level, the first multiplexer outputs the logic low level signal with a second preset data size.

5. The microcontroller as claimed in claim 3, wherein when the number of samples per period of the digital signal is not equal to zero, the second multiplexer outputs the modulated digital signal; when the number of samples per period of the digital signal is equal to zero, the second multiplexer outputs the logic high level signal or the logic low level signal synchronized with the digital signal.

6. The microcontroller as claimed in claim 3, wherein the preset data size depends on the resolution of the digital-to-analog converter.

7. The microcontroller as claimed in claim 1, further comprising:

a decoder, receiving and decoding the modulated digital signal to obtain the data content of the digital signal; and at least one comparator, filtering the first carrier signal and/or the second carrier signal according to frequency of the first carrier signal loaded on the digital signal at the logic high level and/or the second carrier signal loaded on the digital signal at the logic low level.

8. The microcontroller as claimed in claim 7, wherein the encoder is a Manchester encoder, and the decoder is a Manchester decoder.

9. A method of signal modulation, comprising:

receiving a control signal and a data signal, wherein the control signal comprises number of samples per period of the digital signal, interval period of sampling the digital signal, amplitude of the first and second carrier signals, bias of the first and second carrier signals, and interval period of the modulated digital signal at the output;

encoding the data signal to generate a digital signal that is encoded;

loading a first carrier signal on the digital signal at logic high level and loading a second carrier signal on the digital signal at logic low level according to the control signal to generate a modulated digital signal, wherein a frequency of the first carrier signal is different from a frequency of the second carrier signal; and converting the modulated digital signal into an analog signal, and outputting the analog signal for transmission.

10. The method as claimed in claim 9, further comprising:

outputting the logic high level signal or the logic low level signal with a preset data size according to the digital signal; and outputting the modulated digital signal or outputting the logic high level signal or the logic low level signal synchronized with the digital signal according to the number of samples per period of the digital signal.

11. The method as claimed in claim 10, wherein when the digital signal is at the logic high level, the logic high level signal with a first preset data size is output; when the digital signal is at the logic low level, the logic low level signal with a second preset data size is output.

12. The method as claimed in claim 10, wherein when the number of samples per period of the digital signal is not equal to zero, the modulated digital signal is output; when the number of samples per period of the digital signal is equal to zero, the logic high level signal or the logic low level signal synchronized with the digital signal is output.

13. The method as claimed in claim 9, further comprising:

receiving and decoding the modulated digital signal to obtain data content of the digital signal; and filtering the first carrier signal and/or the second carrier signal according to frequency of the first carrier signal loaded on the digital signal at the logic high level and/or the first carrier signal loaded on the digital signal at the logic low level.

14. The method as claimed in claim 9, wherein encoding the data signal comprises encoding the data signal using Manchester coding.

* * * * *